US006742089B1

United States Patent
Inoue et al.

(10) Patent No.: US 6,742,089 B1
(45) Date of Patent: May 25, 2004

(54) ACCESS CONTROLLER AND ACCESS METHOD FOR CONTROLLING ACCESS FROM A CPU TO A MEMORY BASED ON USE STATES OF PLURAL ACCESS PORTS

(75) Inventors: Takao Inoue, Ehime (JP); Yasushi Imamura, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,196

(22) PCT Filed: Jan. 20, 2000

(86) PCT No.: PCT/JP00/00265

§ 371 (c)(1),
(2), (4) Date: Jul. 27, 2001

(87) PCT Pub. No.: WO00/45261

PCT Pub. Date: Aug. 3, 2000

(30) Foreign Application Priority Data

Jan. 27, 1999 (JP) ............................................. 11-18878

(51) Int. Cl.$^7$ ......................... G06F 12/00; G06F 13/00
(52) U.S. Cl. ..................... 711/149; 711/154; 709/102; 709/107; 710/48; 710/130; 710/260; 710/261; 710/264; 710/267
(58) Field of Search ................................. 711/149, 151, 711/154, 158; 709/102, 107; 710/38, 48, 260, 261, 264, 267, 130

(56) References Cited

U.S. PATENT DOCUMENTS

| 5,371,887 | A | * | 12/1994 | Yoshida et al. ............. 709/107 |
| 5,875,470 | A | * | 2/1999 | Dreibelbis et al. .......... 711/105 |
| 5,892,968 | A | * | 4/1999 | Iwasaki et al. ................ 710/1 |
| 6,314,499 | B1 | * | 11/2001 | Kermani ..................... 711/147 |
| 6,401,176 | B1 | * | 6/2002 | Fadavi-Ardekani et al. 710/240 |

FOREIGN PATENT DOCUMENTS

| JP | 62-20042 | 1/1987 |
| JP | 2-163834 | 6/1990 |
| JP | 2-253440 | 10/1990 |

* cited by examiner

Primary Examiner—Mano Padmanabhan
Assistant Examiner—Jasmine Song
(74) Attorney, Agent, or Firm—Wenderoth, Lind & Ponack, L.L.P.

(57) ABSTRACT

An access controller comprising plural access ports in which information associated with access from a CPU is stored for each access, and a bank management unit for managing use states of the plural access ports and informing the CPU of the use states. The CPU writes the information associated with the access on an unused one of the plural access ports on the basis of the use states provided by the bank management unit. Accordingly, the access controller which has a function of not accessing an erroneous address, suppresses the CPU processing load, and does not require a complicated description of firmware can be provided.

12 Claims, 4 Drawing Sheets

<Structures of registers in each access port>

DRAM byte address specifying register 21

DRAM word data reading/writing register 22 access mode specifying register 23
— DRAM address variability specifying bit 24
— DRAM address increase/decrease specifying bit 25

ACCESS CONTROLLER AND ACCESS METHOD FOR CONTROLLING ACCESS FROM A CPU TO A MEMORY BASED ON USE STATES OF PLURAL ACCESS PORTS

TECHNICAL FIELD

The present invention relates to an access controller and an access method and, more particularly, to an access controller and an access method for controlling access from a CPU (Central Processing Unit) to a memory.

BACKGROUND ART

FIG. 5 is a block diagram partly illustrating a structure of a prior art information processor. This Figure shows a structure associated with access from a CPU 160 or first and second processing circuits 500 and 510 to a DRAM (Dynamic Random Access Memory) 120.

The information processor as shown in FIG. 5 comprises the CPU 160, an access port 140, the DRAM 120, a bus arbiter 130, and the first and second processing circuits 500 and 510. Assume that the access port 140, the DRAM 120, the bus arbiter 130, and the first and second processing circuits 500 and 510 are manufactured on an LSI 110.

The CPU 160 controls the whole operation of the information processor. The DRAM 120 is a memory on which information associated with the operation of the information processor is written, which retains the information, and from which the information is read. When access to the DRAM 120 is requested by the CPU 160 and the first and second processing circuits 500 and 510, the bus arbiter 130 authorizes the access in order of descending priorities. The access port 140 comprises a register on which the information associated with the access request to the DRAM 120 output by the CPU 160 is written, and transmits the access request to the bus arbiter 130. The first and second processing circuits 500 and 510 are arbitrary processing circuits, and therefore the number of these circuits is not restricted to two.

FIG. 6 is a block diagram illustrating a structure of the access port 140. The access port 140 comprises a DRAM byte address specifying register 141, a DRAM word data reading/writing register 142, and an access mode specifying register 143. The access mode specifying register 143 comprises a DRAM address variability specifying bit 144 and a DRAM address increase/decrease specifying bit 145.

The DRAM byte address specifying register 141 is a register on which an address in the DRAM that the CPU 160 intends to access is written. The DRAM word data reading/writing register 142 retains the data of the address that has been written on the DRAM byte address specifying register 141 or data to be written at the address that has been written on the DRAM byte address specifying register 141. The access mode specifying register 143 specifies how to access the DRAM 120. The DRAM address variability specifying bit 144 specifies by 1 or 0 whether the address that has been written on the DRAM byte address specifying register 141 is to be consecutively varied or not. The DRAM address increase/decrease specifying bit 145 specifies by 1 or 0 whether the address that has been written on the DRAM byte address specifying register 141 is to be consecutively increased or decreased. address variability specifying bit 144 specifies by 1 or 0 whether the address which has been written on the DRAM byte address specifying register 141 is to be consecutively varied or not. The DRAM address increase/decrease specifying bit 145 specifies by 1 or 0 whether the address which has been written on the DRAM byte address specifying register 141 is to be consecutively increased or decreased.

Next, the access operation will be described with reference to FIGS. 5 and 6.

When the CPU 160 intends to read data at a predetermined address, for example an address of 0×0500, 0 is written on the DRAM address variability specifying bit 144 and the address of 0×0500 is written on the DRAM byte address specifying register 141. When the CPU 160 accesses contiguous addresses, for example addresses of 0×0500 to 0×0508, 1 is written on the DRAM address variability specifying bit 144, 1 is written on the DRAM address increase/decrease specifying bit 145, and the address of 0×0500 is written on the DRAM byte address specifying register 141. In addition, when the CPU 160 accesses contiguous addresses in descending order, for example the addresses from 0×0508 to 0×0500, 1 is written on the DRAM address variability specifying bit 144, 0 is written on the DRAM address increase/decrease specifying bit 145, and the address of 0×0508 is written on the DRAM byte address specifying register 141.

The CPU 160 outputs the access request to the bus arbiter 130 via the access port 140. When the access to the DRAM 120 is also requested by the first and second processing circuits 500 and 510, the bus arbiter 130 compares the request of the CPU 160 with the requests of the first and second processing circuits 500 and 510, and authorizes the access to the address for the request having the highest priority. For example, when the priority of the request by the CPU 160 is the highest, the bus arbiter 130 accesses the address requested by the CPU 160. The data at the accessed address are read into the DRAM word data reading/writing register 142. When the CPU 160 accesses the DRAM word data reading/writing register 142, it can read the data at the address for which the access request is made. At this time, when 0 has been written on the DRAM address variability bit 144, the reading is terminated. When 1 has been written on the DRAM address variability bit 144, the address which has been written on the DRAM byte address specifying register 141 is incremented or decremented in accordance with the specification of the DRAM address increase/decrease specifying bit 145. The data at the incremented or decremented address are read into the DRAM word data reading/writing register 142 via the bus arbiter 130.

When the CPU 160 intends to write data at a predetermined address in the DRAM 120, the CPU 160 writes the address on the DRAM byte address specifying register 141 and thereafter writes data to be written on the DRAM word data reading/writing register 142. When the CPU 160 accesses the requested address via the bus arbiter 130, the data which have been written on the DRAM word data reading/writing register 142 are written at the accessed address. When the CPU 160 intends to write data at contiguous addresses, the address in the DRAM byte address specifying register 141 is incremented or decremented using the above-mentioned DRAM address variability bit 144 and DRAM address increase/decrease specifying bit 145. Each time the address is incremented or decremented, the data which are to be written are written on the DRAM word data reading/writing register 142. Accordingly, the data can be consecutively written at the predetermined addresses.

Japanese Published Patent Application No.Hei.2-253440 discloses a time division multitask execution device which executes tasks which are written on plural register files with switching the tasks, using firmware.

When an access request to the DRAM 120 is output for the plural tasks of CPU multitask processing or interrupt processing while the CPU 160 accesses the DRAM 120 via the access port 140, the access, which has been executed until then, is interrupted. Then, information that is retained in the respective registers in the access port 140 is updated according to the tasks of the CPU multitask processing or interrupt processing.

However, in the above-mentioned system for accessing the DRAM 120 according to the prior art, even when the interrupted access is resumed, the address or data that has been updated in the middle may remain for some reason, whereby erroneous processing is executed.

For example, in order to execute a task of reading data at an address of 0x0500 in the DRAM, the CPU 160 writes 0 on the DRAM address variability specifying bit 144 and writes 0x0500 on the DRAM byte address specifying register 141. Here, when the interrupt processing is commanded immediately before the CPU 160 reads data of the DRAM word data reading/writing register 142, the CPU 160 interrupts the task, then writes the address that is requested by the interrupt processing, for example 0x0800, on the DRAM byte address specifying register 141, and reads data of the DRAM word data reading/writing register 142. When the interrupt processing is completed, the CPU 160 executes the task which has been interrupted. However, the data at the address of 0x0500 may be replaced with the data at the address of 0x0800 which are read in the interrupt processing, for some reason.

As another example, in order to execute a task of writing desired data at contiguous addresses in the direction in which the address is increased +2 by +2 from the address of 0x0500 in the DRAM 120 (0x0500, 0x0502, 0x0504, . . . ), the CPU 160 writes 1 on the DRAM address variability specifying bit 144 and 1 on the DRAM address increase/decrease specifying bit 145, respectively, writes 0x0500 on the DRAM byte address specifying register 141, and writes the desired data on the DRAM word data reading/writing register 142. When the interrupt processing is commanded after the data that have been written on the DRAM word data reading/writing register 142 are written at the addresses of 0x0500 and 0x0502, the CPU 160 interrupts the task, then writes the address of 0x00800 which is requested by the interrupt processing on the DRAM byte address specifying register 141, and reads the data at the address of 0x0800 which are read into the DRAM word data reading/writing register 142. When the CPU 160 executes the task again, even when the task intends to write the data successively at the address of 0x0504 in the DRAM, data may be written at the address of 0x0802 for some reason.

In order to avoid the above-mentioned problem that an erroneous address or data may be processed when the interrupted task is resumed, there is the technique of taking measures against the problem on the firmware side controlling the CPU 160. For example, to execute a certain task, the CPU 160 writes 0 on the DRAM address variability specifying bit 144 and writes 0x0500 on the DRAM byte address specifying register 141. When the interrupt processing is commanded immediately before the CPU 160 reads the data of the DRAM word data reading/writing register 142, the CPU 160 saves the respective information in the DRAM byte address specifying register 141, the DRAM word data reading/writing register 142 and the access mode specifying register 143 to a memory or the like under control of the CPU 160. Then, the CPU 160 writes the address which is requested by the interrupt processing, i.e., 0x0800 on the DRAM byte address specifying register 141 and reads the data at 0x0800 from the DRAM word data reading/writing register 142. When the CPU 160 resumes the interrupted task, the respective values of the registers, which have been saved to the memory under control of the CPU 160, are returned to the original registers.

As described above, when the task is interrupted by the plural tasks of the CPU multitask processing or interrupt processing, the information that has been written in the register is saved to the memory under control of the CPU 160. Then, when the interrupted task is resumed, the information which has been saved is returned to the register, whereby the address or data which is used in the tasks of the CPU multitask processing or interrupt processing does not remain in the register and the task can be executed normally. However, in this technique, the firmware controlling the CPU 160 has a complicated structure. In addition, when the tasks are switched frequently, the number of times that data in the register in the access port 140 are saved or saved data are returned is increased, whereby the CPU processing load is further increased.

In the time division multitask execution device disclosed in Japanese Published Patent Application No.Hei.2-253440, the execution of the tasks which have been written by the firmware on the respective register files is automatically switched and the states of use in the register files are managed directly by the CPU. Therefore, the load on the CPU is further increased.

The present invention is directed to solving the above-mentioned problems. It is an object of the present invention to provide an access controller that has a function of not accessing an erroneous address when a task which has been interrupted by the plural tasks of the CPU multitask processing or interrupt processing is resumed. More particularly, it is an object of the present invention to provide an access controller that suppresses the CPU processing load and does not require a complicated description of the firmware.

DISCLOSURE OF THE INVENTION

To attain the above-mentioned object, an access controller according to the present invention for relaying access from a CPU which can execute time division processing of plural tasks and interrupt processing to a predetermined memory, comprises: plural access ports in which information associated with the access from the CPU is stored for each access; and a management unit for managing use states of the plural access ports, and informing the CPU of the use states, and the CPU writes the information associated with the access on an unused one of the plural access ports on the basis of the use states provided by the management unit.

The access controller according to the present invention comprises the plural access ports. Therefore, even when the tasks are executed in the time division multiplexing, respective information of the tasks is written on different access ports, whereby an erroneous address is not accessed or erroneous data are not read or written. Further, the number of times that the tasks are switched is reduced as compared with the prior art having a saving function but having only one access port. Therefore, the tasks can be executed more efficiently, whereby the CPU processing load is reduced.

In addition, in the access controller according to the present invention, the management unit further comprises: a save area to which information stored in an arbitrary access port is saved so that information associated with an access request of another task or interrupt processing which is activated when the plural access ports are all in use is stored in the arbitrary access port; and save and return means for saving the information which has been written on the arbitrary access port to the save area, and returning the information which has been saved in the save area to the access port.

Therefore, the use states of the access ports and the saving or return of the information which has been written on the access port can be controlled by a small-scale circuit. Accordingly, the description of the firmware becomes simpler and the load on the CPU can be reduced. Further, the bank management unit comprises a save area. Therefore, even when the interrupt processing is requested when the access ports are all in use, data in one of the access ports which are in use is saved to the save area, whereby the interrupt processing can be executed.

Further, in the access controller according to the present invention, each of the access ports comprises: address specifying means for specifying an address in the memory which is to be accessed by the CPU; retaining means for temporarily retaining data which are read at the address specified by the address specifying means or data which are to be written at the address specified by the address specifying means; and address variability specifying means for specifying whether or not the address specified by the address specifying means is to be incremented or decremented.

In an access method according to the present invention for making access from a CPU which can execute time division processing of plural tasks and interrupt processing to a predetermined memory via an access controller having plural access ports and a management unit, the management unit recognizes use states of the plural access ports; the CPU stores information associated with the access in an arbitrary one of the access ports which is recognized by the management unit to be unused; the management unit records as the use state of the arbitrary access port in the management unit that the arbitrary access port is in use, when the information is stored in the arbitrary access port; the management unit makes access to the memory on the basis of the stored information; and the management unit records as the use state of the arbitrary access port in the management unit that the arbitrary access port is on standby, after the access is completed.

The access method according to the present invention uses the plural access ports. Therefore, even when the tasks are executed in the time division multiplexing, respective information of the tasks is written on different access ports, whereby an erroneous address is not accessed or erroneous data are not read or written. Further, the number of times that the tasks are switched is reduced as compared with the prior art having a save function but having only one access port. Therefore, the tasks can be executed more efficiently, whereby the CPU processing load can be reduced.

Further, in the access method of the present invention, the management unit saves information stored in an arbitrary one of the access ports to the management unit when recognizing that the plural access ports are all in use; the CPU stores information associated with access in the arbitrary access port; the management unit accesses the memory on the basis of the stored information; the management unit returns the information which has been saved to the management unit to the arbitrary access port after the access is completed; and the management unit resumes access on the basis of the returned information.

Therefore, the use states of the access port and the saving or return of the information which has been written on the access port can be controlled by a small-scale circuit. Therefore, the description of the firmware becomes simpler and the load on the CPU can be reduced. Further, the bank management unit comprises a save area. Therefore, even when the interrupt processing is requested when the access ports are all in use, data in one of the access ports which are in use are saved to the management unit, whereby the interrupt processing is executed.

BEST MODE FOR CARRYING OUT THE INVENTION

Hereinafter, an access controller according to an embodiment of the present invention is described with reference to the drawings.

Figure 1:
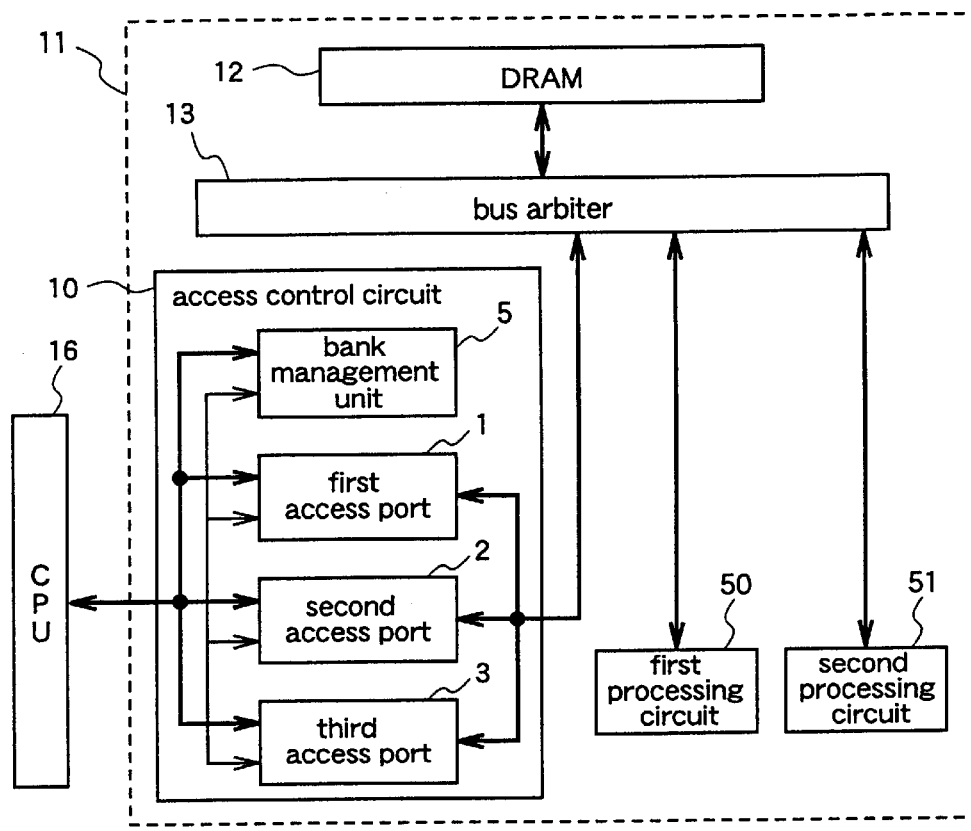
FIG. 1 is a block diagram schematically illustrating a structure of an access controller according to an embodiment of the present invention.

FIG. 1 is a block diagram schematically illustrating a structure of an information processor comprising a circuit corresponding to the access controller according to this embodiment, i.e., an access control circuit 10. The information processor comprises a CPU 16, an access control circuit 10, a DRAM 12, a bus arbiter 13, and first and second processing circuits 50 and 51. The access control circuit 10, the DRAM 12, the bus arbiter 13, and the first and second processing circuits 50 and 51 are manufactured on an LSI 11. The access control circuit 10 comprises first to third access ports 1, 2 and 3, and a management unit, i.e., a bank management unit 5.

The CPU 16 controls the whole operation of the information processor. The DRAM 12 is a memory on which information associated with the operation of the information processor is written, which retains the information, and from which the information is read. When the access to the DRAM 12 is requested by the CPU, and the first and second processing circuits 50 and 51, the bus arbiter 130 authorizes the access to the address for the request having a highest priority. Each of the first to third access ports 1, 2 and 3 comprises a register containing information which is required for the access from the CPU 16 to the DRAM 12, and transmits the access request to the bus arbiter 13. The bank management unit 5 manages the states of use in the first to third access ports 1, 2 and 3, and informs the CPU 16 of the states of use. Further, the bank management unit 5 comprises a save area to which information which has been written on the first access port 1 is saved in accordance with the command of the CPU 16, and a save and return means for saving the information to the save area and returning the saved information to the access port.

Figure 2:
FIG. 2 is a block diagram illustrating a common structure of first, second and third access ports 1, 2 and 3.
Figure 2:
Figure 2:
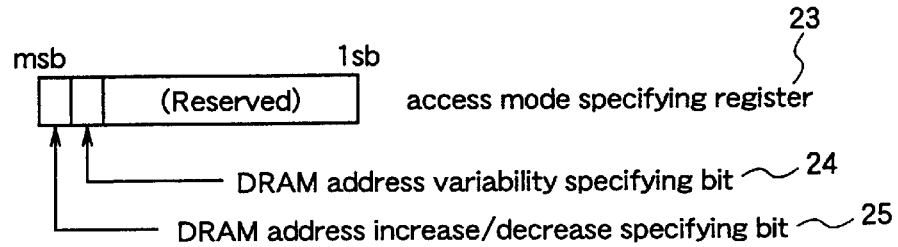

FIG. 2 is a block diagram illustrating a common structure of the first to third access ports 1, 2 and 3. Each of the first to third access ports 1, 2 and 3 comprises a DRAM byte address specifying register 21, a DRAM word data reading/writing register 22 and an access mode specifying register 23. Further, the access mode specifying register 23 comprises a DRAM address variability specifying bit 24 and a DRAM address increase/decrease specifying bit 25, as address variability specifying means for specifying whether the address which is specified by the DRAM byte address specifying register 21 is to be incremented or decremented or not.

The DRAM byte address specifying register 21 is an address specifying means for specifying a DRAM address which the CPU 16 intends to access. The DRAM word data reading/writing register 22 is a retaining means for temporarily retaining data which are read at the address stored in the DRAM byte address specifying register 21 or data to be written at the address stored in the DRAM byte address specifying register 21. The access mode specifying register 23 specifies how to access the DRAM 12. The DRAM address variability specifying bit 24 specifies whether the address written on the DRAM byte address specifying register 21 is to be varied consecutively or not, by 1 or 0. The DRAM address increase/decrease specifying bit 25 specifies whether the address is varied in the direction in which the number is increased or in the direction in which the number is decreased, by 1 or 0.

For example, when the CPU 16 intends to consecutively access addresses of 0x0500 to 0x0508 in the DRAM 12, 1 is written on the DRAM address variability specifying bit 24, 1 is written on the DRAM address increase/decrease specifying bit 25, and 0x0500 is written on the DRAM byte address specifying register 21, whereby data at the addresses of 0x0500 to 0x0508 are read into the DRAM word data reading/writing register 22. In addition, when the addresses to be accessed are 0x0508 to 0x0500, 1 is written on the DRAM address variability specifying bit 24, 0 is written on the DRAM address increase/decrease specifying bit 25, and 0x0508 is written on the DRAM byte address specifying register 21. Further, when the address to be accessed is 0x0508, 0 is written on the DRAM address variability specifying bit 24 and 0x0508 is written on the DRAM byte address specifying register 24. It is good that the number of contiguous data or the address of the last data in the contiguous data can be specified by the access mode specifying register 23. The value which is incremented or decremented by the DRAM address increase/decrease specifying bit 25 is a previously decided value.

Figure 3:
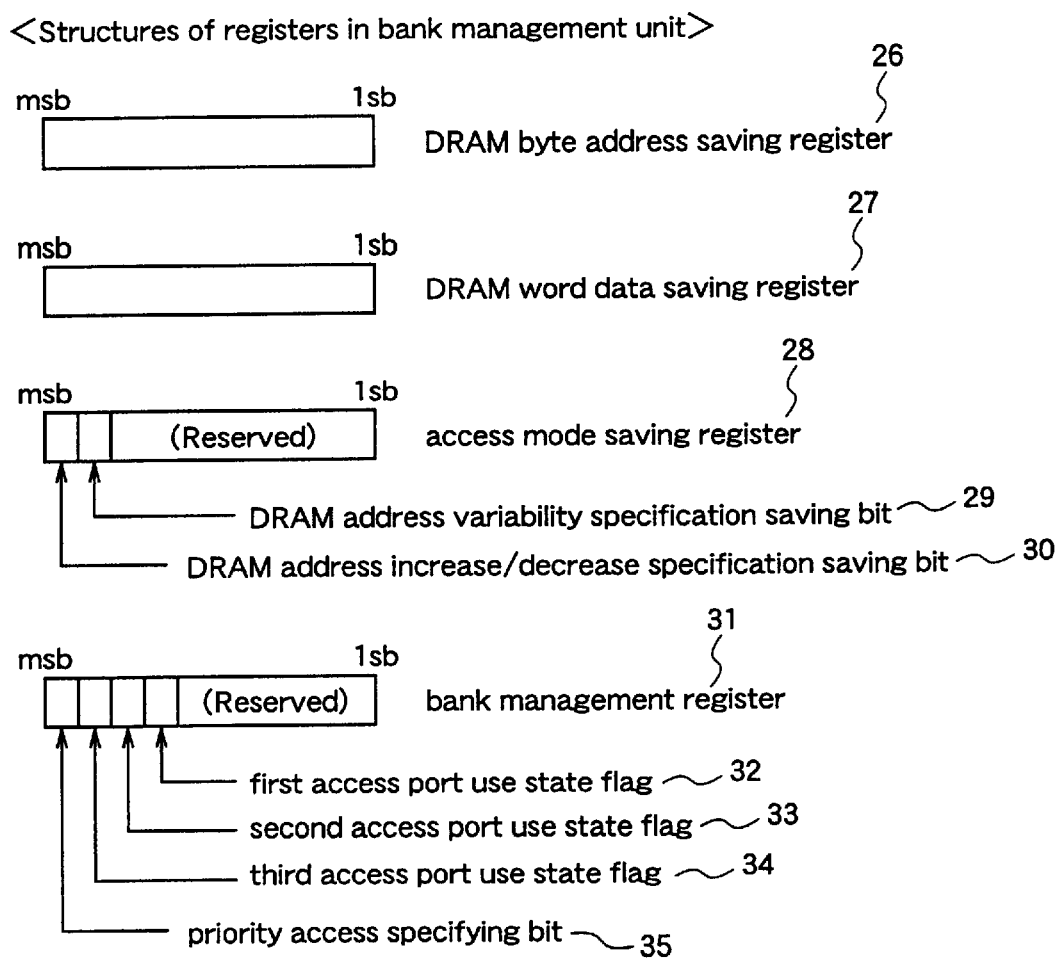
FIG. 3 is a block diagram illustrating a structure of a bank management unit 5.

FIG. 3 is a block diagram illustrating a structure of the bank management unit 5. The bank management unit 5 comprises a DRAM byte address saving register 26, a DRAM word data saving register 27, an access mode saving register 28, and a bank management register 31.

The DRAM byte address saving register 26 is an area, i.e., a register, in which the value of the DRAM byte address specifying register 21 in the first access port 1 is temporarily stored. The DRAM word data saving register 27 is a register in which the value of the DRAM word data reading/writing register 22 in the first access port 1 is temporarily stored. The access mode saving register 28 is a register in which the value of the access mode specifying register 23 in the first access port 1 is temporarily stored, and it includes a DRAM address variability specification saving bit 29 and a DRAM address increase/decrease specification saving bit 30. The bank management register 31 manages the state of use in the three access ports 1, 2 and 3, and informs the CPU 16 of the use state.

The bank management register 31 comprises a first access port use state flag 32, a second access port use state flag 33, a third access port use state flag 34 and a priority access specifying bit 35. For example, when the first access port use state flag 32 is 0, it means that the first access port 1 is on standby. When the first access port use state flag 32 is 1, it means that the first access port 1 is in use. Ditto for the second access port use state flag 33 and the third access port use state flag 34. The priority access specifying bit 35 specifies the saving and return of the respective information of the registers in the first access port. For example, when the CPU 16 writes 1 on the priority access specifying bit 35, information in the DRAM byte address specifying register 21 in the first access port 1 is saved to the DRAM byte address saving register 26, information in the DRAM word data reading/writing register 22 is saved to the DRAM word data saving register 27, and information in the access mode specifying register 23 is saved to the access mode saving register 28. In addition, when the CPU 16 writes 0 on the priority access specifying bit 35, the information in the DRAM byte address saving register 26 is returned to the DRAM byte address specifying register 21 in the first access port 1, the information in the DRAM word data saving register 27 is returned to the DRAM word data reading/writing register 22, and the information in the access mode saving register 28 is returned in the access mode specifying register 23.

Figure 4:
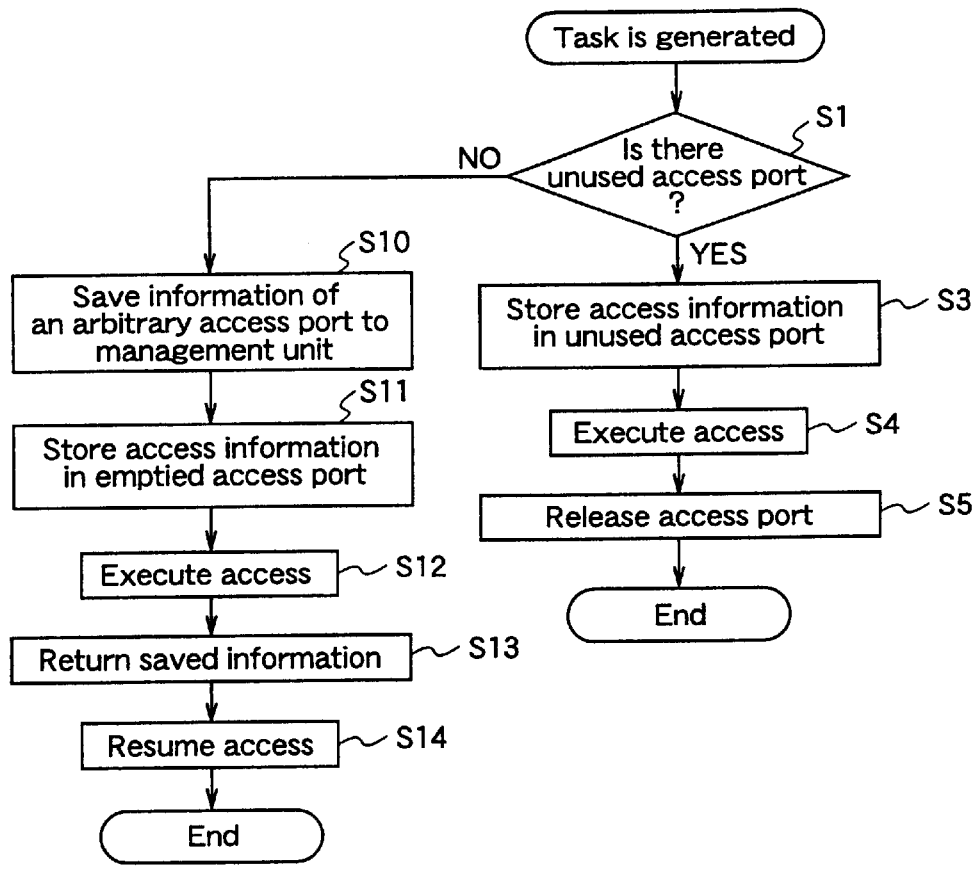
FIG. 4 is a flowchart schematically showing an operation of an access method according to the embodiment of the present invention.
Figure 5:
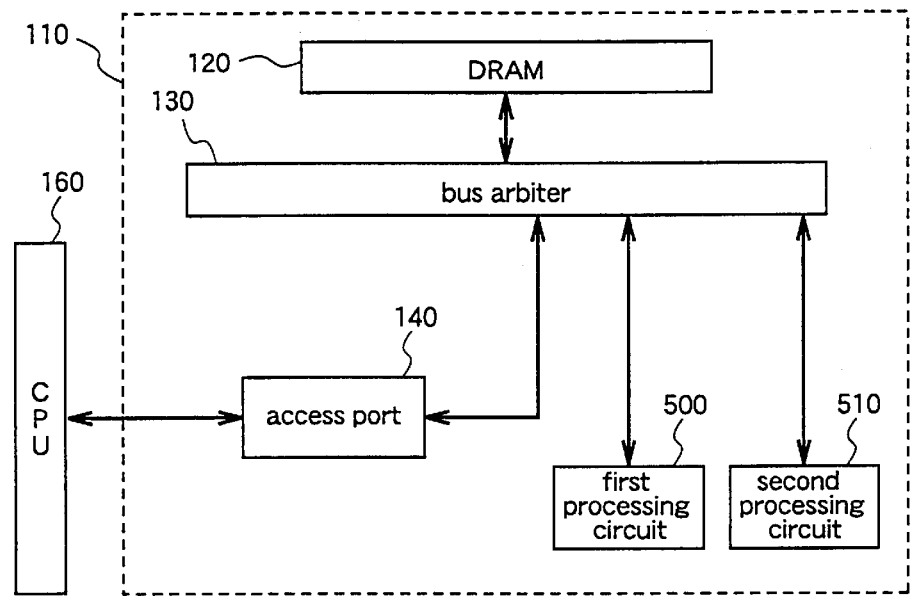
FIG. 5 is a block diagram schematically illustrating a structure of a prior art access controller.
Figure 6:
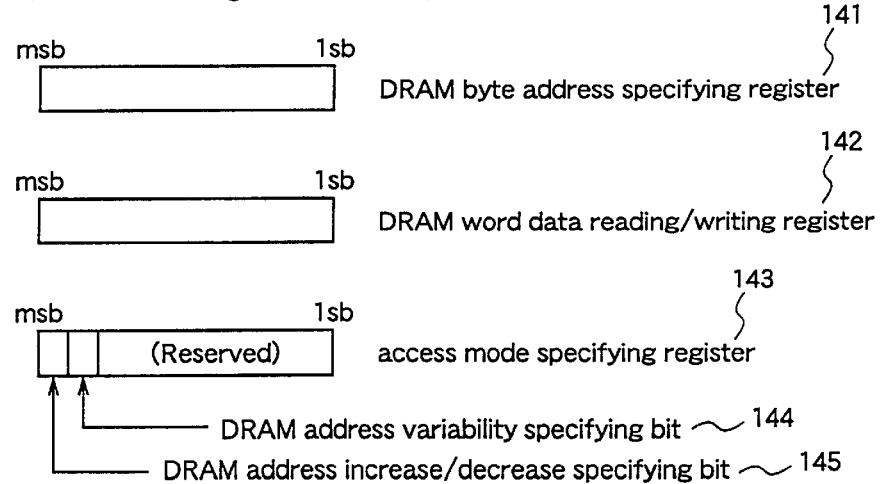
FIG. 6 is a block diagram illustrating a structure of a prior art access port 140.

FIG. 4 is a flowchart schematically showing the operation of an access method according to this embodiment. The access method according to this embodiment is described with reference to FIGS. 1 and 4.

When the task is generated, the CPU 16 inquires of the bank management unit 5 about the use states of the access ports (1, 2 and 3), and recognizes whether there is an unused access port or not (step S1).

When there is an unused access port, the processing proceeds to step S3. The CPU 16 stores access information of the task in the unused access port. At this time, the bank management unit 5 turns the use state flag (32, 33 or 34) of the access port which has been used, into the used condition. Subsequently, the CPU 16 accesses the desired address in the DRAM 12 via the bus arbiter 13 (step S4).

When the access operation is completed, the bank management unit 5 turns the use state flag of the used access port on standby, and releases the access port (step S5).

On the other hand, when an unused access port is not recognized in step S1, the processing proceeds to step S10 and information of an arbitrary access port (the first access port 1 in FIG. 1) is saved to the bank management unit 5.

Then, the CPU 16 stores the access information of the generated task in the access port whose information is saved to be emptied, (step S11) and executes the access to the DRAM 12 (step S12).

When the access in step S12 is completed, the information which has been saved in step S10 is returned to the original access port (step S13) and the access of the saved information is resumed (step S14). When the resumed access is completed, the access port is released as in the step S5.

The operation as shown in FIG. 4 is further described with reference to FIGS. 1, 2 and 3, using a specific example. Initially, a description is given of a case where the access to the DRAM 12 is made under a situation where the firmware controlling the CPU 16 executes the multitask processing, and first, second and third tasks are executed in time division multiplexing.

Assume that the first task instructs to read data which are at every other address from 0x0400 to 0x040E in the DRAM 12, the second task instructs to write data at every other address from 0x0800 to 0x07F6 in the DRAM 12 in descending order, and the third task instructs to write data at addresses of 0×1000, 0×1002 and 0×1004 in the DRAM 12. The tasks are executed in the order of the first task, second task and third task. The three access ports are used in the order of the first access port, second access port and third access port. In addition, when 1 is written on the DRAM address variability specifying bit 24, the address is varied by two.

Initially, the first task reads the bank management register 31 in the bank management unit 5 and recognizes that all of the access ports are usable. The first task writes 1 on the first access port use state flag 32, whereby the fact that the first access port is in use is recorded. Then, the first task writes 1 on the DRAM address variability specifying bit 24 in the first access port 1 and 1 on the DRAM address increase/decrease specifying bit, respectively, writes 0×0400 on the DRAM byte address specifying register 21, and reads data at a desired address into the DRAM word data reading/writing register 22, thereby obtaining desired data. When the control proceeds to the second task at a time when the first task has read the data at the addresses of 0×0400, 0×0402 and 0×0404, the first task is temporarily suspended.

The second task reads the bank management register 31, and recognizes that the second and third access ports 2 and 3 are usable. The second task writes 1 on the second access port use state flag 33, thereafter writes 1 on the DRAM address variability specifying bit 24 in the second access port 2 and 0 on the DRAM address increase/decrease specifying bit 25, respectively, writes 0×0800 on the DRAM byte address specifying register 21, and writes data on the DRAM word data reading/writing register 22. Thus, the data which have been written on the DRAM word data reading/writing register 22 are written at a desired address in the DRAM 12. When the control proceeds to the third task at a time when the second task writes data at the addresses of 0×0800 and 0×0×7FE, the second task is temporarily suspended.

The third task reads the bank management register 31 and recognizes that the third access port is usable. The third task writes 1 on the third access port use state flag 34, thereafter writes 1 on the DRAM address variability specifying bit 24 in the third access port 3 and 1 on the DRAM address increase/decrease specifying bit 25, respectively, writes 0×1000 on the DRAM byte address specifying register 21, and writes data on the DRAM word data reading/writing register 22. Thus, the data which have been written on the DRAM word data reading/writing register 22 are written at a desired address in the DRAM 12. When the control moves from the third task to the first task at a time when the data have been written at addresses of 0×1000 and 0×1002, the third task is temporarily suspended.

The first task resumes the reading from the address of 0×0406, reads data at addresses of 0×0408, 0×040A, 0×040C and 0×040E, and terminates the reading of data. Subsequently, 0 is written on the first access port use state flag 32, whereby the fact that the first access port is on standby is recorded and then the first access port 1 is released.

Then, the control proceeds to the second task. The second task writes remaining data, i.e., data to be written at addresses of 0×07FC, 0×07FA, 0×07F8 and 0×07F6 on the DRAM word data reading/writing register 22 in the second access port 2. When the data which have been written in the DRAM word data reading/writing register 22 are written at a desired address in the DRAM 12, the writing of data by the second task is completed. Subsequently, 0 is written on the second access port use state flag 33 and the second access port 2 is released.

Then, the control proceeds to the third task. The third task writes remaining data, i.e., data to be written at an address of 0×1004 in the DRAM word data reading/writing register 22 in the third access port 3. When the data which have been written on the DRAM word data reading/writing register 22 are written at the address of 0×1004 in the DRAM 12, the writing of data by the third task is completed. Subsequently, 0 is written on the third access port use state flag 34 and the third access port 3 is released.

Next, with reference to FIGS. 1, 2 and 3, a description is given of a case where an interrupt processing D is activated and access to the DRAM 12 is intended while the first, second and third tasks are using the first, second and third access ports 1, 2 and 3, respectively, under a situation where the firmware controlling the CPU 16 executes the multitask processing and the first, second and third tasks are executed in time division multiplexing.

The interrupt processing D reads the bank management register 31, recognizes that the three access ports are all in use, and writes 1 on the priority access specifying bit 35. Information which has been written on the respective registers 21, 22 and 23 in the first access port 1 in accordance with the specification of the priority access specifying bit 35 is saved to the corresponding saving registers 26, 27 and 28 in the bank management unit 5, respectively. The interrupt processing D accesses the DRAM 12 using the emptied first access port 1. When the access is completed, 0 is written on the priority access specifying bit 35. The information which has been saved to the respective saving registers 26, 27 and 28 in the bank management unit 5 in accordance with the specification of the priority access specifying bit 35 is returned to the corresponding registers 21, 22 and 23 in the first access port 1, respectively.

As described above, according to this embodiment, the plural access ports are employed, whereby even when the tasks are executed in the time division multiplexing, the information of each task is written on the different access port. Therefore, an erroneous address is not accessed or erroneous data are not read or written.

Further, as described above, the access controller according to this embodiment has the access control circuit 10 on the LSI 11 on which the DRAM 12 is provided. However, the access control circuit 10 does not require the complicated structure, whereby it can be manufactured in a small-scale circuit.

In addition, the access control circuit 10 directly manages the access of the CPU 16 to the DRAM 12. Therefore, the description of the firmware becomes simpler as compared with the device controlling the access to the DRAM by the firmware, which is disclosed in Japanese Published Patent Application No.Hei.2-253440. Accordingly, the load on the CPU processing is reduced.

Further, the plural access ports are included, whereby the number of times that the tasks are switched is reduced as compared with the prior art having the saving function but having only one access port. Therefore, the task can be processed efficiently, thereby reducing the CPU processing load.

Further, the access control circuit 10 comprises the saving registers. Therefore, even when the interrupt processing is requested while the access ports are all in use, data in one of the access ports which are in use are saved to the saving register, whereby the interrupt processing can be executed. Accordingly, the load on the CPU processing can be reduced relative to the prior art having the saving register in the CPU.

In this embodiment, the description is given of a case where the CPU 16 accesses the DRAM 12. However, this embodiment can be applied to a case where the CPU 16 accesses a memory other than the DRAM, for example SRAM or ROM.

Here, the ROM is a memory intended for reading only. Therefore, an access controller which has a function of reading data in the access control circuit 10 is employed.

In this embodiment, the description is given of the access controller comprising three access ports and an area to which information stored in an arbitrary one of the access ports is saved, i.e., a saving register. The numbers of the access ports and the saving register are not restricted to the numbers described in this embodiment. These numbers can be properly decided according to the purposes of the access controller.

INDUSTRIAL AVAILABILITY

The present invention is applicable to all devices in which a CPU (central processing unit) accesses a memory.

What is claimed is:

1. An access controller for relaying access from a CPU, which can execute time division processing of plural tasks and interrupt processing, to a predetermined memory, comprising:

plural access ports each including an address specifying register, a data reading/writing register, and an access mode specifying register, operable to store information associated with the access to the memory from the CPU for each access; and a management unit operable to manage use states of said plural access ports, and informing the CPU of the use states, wherein the CPU writes the information associated with the access on an unused one of said plural access ports based on the use states provided by said management unit.

2. The access controller of claim 1 wherein said management unit further comprises:

a save area to which information stored in an arbitrary access port is saved so that information associated with an access request of another task or interrupt processing which is activated when the plural access ports are all in use is stored in the arbitrary access port; and save and return means for saving the information which has been written on the arbitrary access port to said save area, and returning the information which has been saved in said save area to the arbitrary access port.

3. The access controller of claim 2 wherein each of said plural access ports comprises:

address specifying means for specifying an address in the memory which is to be accessed by the CPU;

retaining means for temporarily retaining data which are read at the address specified by said address specifying means or data which are to be written at the address specified by said address specifying means; and address variability specifying means for specifying whether or not the address specified by said address specifying means is to be incremented or decremented.

4. The access controller of claim 1 wherein each of said plural access ports comprises:

address specifying means for specifying an address in the memory which is to be accessed by the CPU;

retaining means for temporarily retaining data which are read at the address specified by said address specifying means or data which are to be written at the address specified by said address specifying means; and address variability specifying means for specifying whether or not the address specified by said address specifying means is to be incremented or decremented.

5. An access method for making access from a CPU, which can execute time division processing of plural tasks and interrupt processing, to a predetermined memory via an access controller having plural access ports, each including an address specifying register, a data reading/writing register, and an access mode specifying register, the access ports being between the CPU and a memory, and a management unit, wherein the management unit recognizes use states of the plural access ports, and recognizes whether there are unused access ports or not;

the CPU stores information associated with the access in each of the address specifying register, the data reading/writing register, and the access mode specifying register included in an arbitrary one of the access ports which is recognized by the management unit to be unused;

the management unit records as the use state of the arbitrary access port in the management unit that the arbitrary access port is in use, when the information associated with the access is stored in the arbitrary access port;

the management unit makes access to the predetermined memory based on the information associated with the access stored in each of the address specifying register, the data reading/writing register, and the access mode specifying register included in the arbitrary access port; and the management unit records as the use state of the arbitrary access port in the management unit that the arbitrary access port is on standby, after the access to the predetermined memory is completed.

6. An access method for making access from a CPU, which can execute time division processing of plural tasks and interrupt processing, to a predetermined memory via an access controller having plural access ports and a management unit, wherein when the management unit recognizes that there are unused access ports among the plural access ports while recognizing use states of the plural access ports:

the CPU stores information associated with access in an arbitrary one of the access ports, which is recognized by the management unit to be unused, the management unit records as the use state of the arbitrary access port in the management unit that the arbitrary access port is in use, when storing information in the arbitrary access port, the management unit makes access to the predetermined memory based on the stored information, and the management unit records as the use state of the arbitrary access port in the management unit that the arbitrary access port is on standby, after access is completed; and when the management unit recognizes that the plural access ports are all in use while recognizing use states of the plural access ports:

the management unit saves information stored in an arbitrary one of the access ports in the management unit, the CPU stores information associated with access in the arbitrary access port, the management unit accesses the memory based on the stored information, the management unit returns the information which has been saved in the management unit to the arbitrary access port after the access is completed, and the management unit resumes access based on the returned information.

7. An access controller for use with a CPU and a memory and for use in relaying access from the CPU to the memory, said access controller comprising:

plural access ports, each including an address specifying register, a data reading/writing register, and an access mode specifying register, each access port operable to store, for each occurrence of access to the memory by the CPU, information associated with the access; and a management unit operable to manage use states of said plural access ports, and to output information of the use states indicating whether each access port is respectively capable or incapable of accepting the information associated with the access, wherein the information of the use states is accessible by the CPU.

8. The access controller of claim 7, wherein:

said management unit further comprises:
 an address saving register;
 a word data saving register; and
 an access mode saving register; and said management unit is operable to:
 store information from said address specifying register, data reading/writing register, and access mode specifying register of at least one of said plural access ports in said address saving register, word data saving register, and access mode saving register, respectively, when all of said access ports are in use so as to enable information associated with a further access request to be stored in said at least one access port; and
 return the information stored in said address saving register, word data saving register, and access mode saving register to said at least one access port.

9. The access controller of claim 8, wherein each of said plural access ports further includes an address variability specifying storage area operable to store information specifying whether or not an address stored in said address specifying register is to be incremented or decremented.

10. An information processor comprising:

a memory;

a CPU operable to access said memory; and an access controller comprising:

plural access ports, each including an address specifying register, a data reading/writing register, and an access mode specifying register, each access port operable to store, for each occurrence of access to said memory by said CPU, information associated with the access; and a management unit operable to manage use states of said plural access ports, and to inform said CPU of the use states, wherein the use states indicate whether each access port is respectively capable or incapable of accepting the information associated with the access.

11. The information processor of claim 10, wherein:

said management unit further comprises:
 an address saving register;
 a word data saving register; and
 an access mode saving register; and said management unit is operable to:
 store information from said address specifying register, data reading/writing register, and access mode specifying register of at least one of said plural access ports in said address saving register, word data saving register, and access mode saving register, respectively, when all of said access ports are in use such that said CPU is operable to store information associated with a further access request in said at least one access port; and
 return the information stored in said address saving register, word data saving register, and access mode saving register to said at least one access port.

12. The information processor of claim 11, wherein each of said plural access ports further includes an address variability specifying storage area operable to store information specifying whether or not an address stored in said address specifying register is to be incremented or decremented.

* * * * *